United States Patent Office 2,827,475
Patented Mar. 18, 1958

2,827,475

DIALKYL-2-HALOALLYLPHOSPHONATES AND COPOLYMERS THEREOF

Harry W. Coover, Jr., Kingsport, Tenn., assignor to Eastman Kodak Company, Rochester, N. Y., a corporation of New Jersey No Drawing. Application March 23, 1953
Serial No. 344,240

15 Claims. (Cl. 260—461)

This invention relates to new dialkyl-2-haloallylphosphonate compounds and to copolymers thereof with one or more vinyl monomers.

It is an object of this invention to provide new dialkyl-2-haloallylphosphonate compounds. Another object is to provide a satisfactory process for the preparation of the new dialkyl-2-haloallylphosphonate compounds. A further object is the preparation of new, stable, phosphorus-containing polymers.

The new dialkyl-2-haloallylphosphonate compounds of the present invention have the formula:

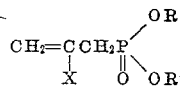

wherein R represents an alkyl group having 1 to 5, inclusive, carbon atoms and X represents a bromine atom or a chlorine atom. They are readily prepared by reacting an allyl halide having the formula:

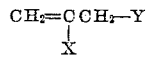

wherein X and Y each represents a chlorine atom or a bromine atom with a trialkyl phosphite having the formula:

or an alkali metal dialkyl phosphite having the formula

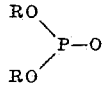

R in the foregoing formulas represents an alkyl group having 1 to 5, inclusive, carbon atoms while M stands for an alkali metal, such as, for example, sodium or potassium. Normally the reactants are employed in molar proportions although the reaction takes place if an excess of either reactant is present.

The reaction taking place between the trialkyl phosphite and the allyl halide is believed to occur substantially as follows:

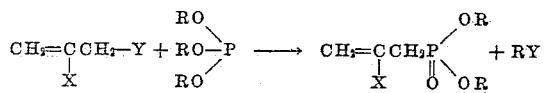

Thus triethyl phosphite and 2-bromoallyl bromide react to form the diethyl-2-bromoallylphosphonate

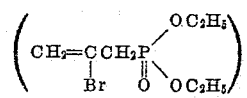

and ethyl bromide. Where an alkali metal dialkyl phosphite is used in place of a trialkyl phosphite an alkali metal halide splits off instead of an alkyl halide.

Trialkyl phosphites used in preparing the new dialkyl-2-haloallylphosphonate compounds of the invention include, for example, trimethyl phosphite, triethyl phosphite, tri-n-propyl phosphite, tri-isopropyl phosphite, tri-n-butyl phosphite and tri-n-amyl phosphite. Alkali metal dialkyl phosphites used in preparing the new dialkyl-2-haloallylphosphonate compounds of the invention include, for example, sodium dimethyl phosphite, potassium dimethyl phosphite, sodium diethyl phosphite, potassium diethyl phosphite, sodium di-n-propyl phosphite, potassium di-n-propyl phosphite, sodium di-n-butyl phosphite, potassium di-n-butyl phosphite, sodium di-n-amyl phosphite and potassium di-n-amyl phosphite.

The new dialkyl-2-haloallylphosphonate compounds of the invention copolymerize with one or more vinyl monomers in varying amounts under the usual conditions. In its broader aspects this invention contemplates the preparation of copolymers obtained by the interpolymerization of the new dialkyl-2-haloallylphosphonate compounds with polymerizable compounds containing the basic vinyl group $CH_2=CH-$ to give valuable polymers which are useful as extrusion, molding and fiber-forming materials. The new polymers may be prepared in mass, in solutions, in suspension, or emulsion in alcohols or other suitable diluents using the usual catalysts or initiating agents. The manner in which the polymerization can be carried out is discussed more fully hereinafter.

Vinyl compounds that can be copolymerized with the new dialkyl-2-haloallylphosphonate compounds of the invention include, for example, acrylonitrile, methyl methacrylate, ethylene, vinyl chloride, vinyl bromide, vinyl fluoride, vinyl esters of carboxylic acids (e. g. vinyl acetate, vinyl butyrate, vinyl stearate, vinyl benzoate, vinyl trifluoroacetate, etc.), vinyl alkyl ketones (e. g. methyl vinyl ketone, ethyl vinyl ketone, trifluoromethyl vinyl ketone, etc.); vinyl alkyl ethers (e. g. methyl vinyl ether, ethyl vinyl ether, vinyl-$\beta$-trifluoroethyl ether, etc.), vinyl sulfonamides (e. g. vinyl sulfonamide, N-methylvinyl sulfonamide, etc.), vinyl alkyl sulfones (e. g. vinyl methyl sulfone, vinyl ethyl sulfone, etc.), vinyl urethanes (e. g. vinyl methyl urethane, vinyl ethyl urethane, etc.), vinyl cyclic imides (e. g. vinyl succinimide, vinyl phthalimide, etc.), acrylic acid, acrylic anhydride, acrylamide, N-alkyl acrylamides and the methyl, ethyl, butyl, benzyl and phenyl esters of acrylic acid, propylene, isobutylene, butadiene, styrenes (e. g. styrene, o-methyl styrene, p-methyl styrene, 2,4-dichloro-$\alpha$-methyl styrene, o-acetamino styrene, etc.) and the like. The new dialkyl-2-haloallylphosphonate compounds of the invention can also be copolymerized with methacrylic acid and its anhydride, methacrylamide, N-alkyl methacrylamide, methacrylonitrile and the methyl, ethyl, butyl, benzyl and phenyl esters of methacrylic acid, $\alpha$-acetoxy acrylonitrile, vinylidene dichloride, vinylidene chloride-fluoride, alkyl esters of maleic and fumaric acids such as methyl maleate, fumaronitrile, cis- and trans-$\beta$-cyano and carboxamido-methyl acrylates and the like. Additionally the new dialkyl-2-haloallylphosphonate compounds of the invention can be copolymerized with the various unsaturated compounds disclosed in U. S. Patent 2,396,785.

The polymerization can be carried out, for example, in mass or dispersed in a non-solvent for the monomers, the particles of dispersed monomer being very small (emulsion) or relatively large (bead or granular). For emulsion polymerization, any non-solvent for the monomers can be employed, water being especially advantageous for the water-insoluble monomers. In this case the monomer or mixture of monomers can be advantageously emulsified in the water using emulsifying agents such as salts of higher fatty acids (e. g. sodium or potassium stearate, palmitate, etc.), ordinary soaps, salts of higher fatty alcohol sulfates (e. g. sodium or potassium cetyl sulfate, sodium or potassium lauryl sulfate, sodium or potassium stearyl sulfate, etc.), salts of aromatic sulfonic acids (e. g. sodium or potassium salts of alkylnaphthalene sulfonic acids, etc.) and higher molecular weight quaternary ammonium salts (e. g. dimethylbenzylphenyl ammonium chloride, quaternary salts containing the radicals $C_{15}H_{31}$ and $C_{17}H_{35}$, etc.). For bead or granular polymerization of the water-insoluble members of my invention relatively poor dispersing agents such as starch, methylated starch, gum arabic, polyvinyl alcohol, partly hydrolyzed polyvinyl acetate, gelatin, sodium glycolate, finely divided magnesium carbonate, etc. can be employed. Mixtures of dispersing agents can be used. In dispersion polymerizations stirring, shaking or tumbling give improved product and yield.

The polymerization of the new dialkyl-2-haloallylphosphonate compounds of the invention with one or more other unsaturated compounds of the character indicated hereinbefore is accelerated by heat, by actinic light and by polymerization catalysts which are known to promote the polymerization of vinyl and other unsaturated organic compounds such as peroxides e. g. benzoyl peroxide, acetyl peroxide, lauroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali perborates, the water-soluble salts of percarbonic acid, the water-soluble salts of perphosphoric acid, etc. The organic peroxides are especially suitable. An effective polymerization catalyst is bis-azo-isobutyronitrile. Mixtures of catalysts can be employed. An activation agent such as sodium bisulfite can be used, if desired, in conjunction with the polymerization catalysts.

As previously noted, when a dialkyl-2-haloallylphosphonate compound is prepared by reacting an alkyl halide with a trialkyl phosphite, an alkyl halide is formed. Where the alkyl halide which is formed boils below the boiling point of the starting 2-haloallyl halide, the procedure set forth in Examples 1, 2 and 3 is conveniently employed. That is, the reaction is carried out at the reflux temperature of the starting 2-haloallyl halide until the reaction is complete. Using this procedure the lower boiling alkyl halide distills over into a receiver where it is recovered while the reaction product remaining in the reaction vessel is purified by fractional distillation under reduced pressure. Some by-product alkanephosphonate is formed by reaction between the trialkyl phosphite and the alkyl halide formed in the reaction between the trialkyl phosphite and the 2-haloallyl halide. This alkanephosphonate by-product is separated from the desired reaction product by the fractional distillation operation just mentioned. In those cases where an alkyl halide would be formed which has a boiling point higher than the starting 2-haloallyl halide compound, the preferred procedure is to react the sodium salt of the corresponding dialkyl hydrogen phosphite with the 2-haloallyl halide although the reaction between the trialkyl phosphite and the 2-haloallyl halide can be carried out to completion under conditions such that distillation does not occur, following which the reaction mixture is fractionally distilled under reduced pressure to recover the desired product.

The following examples illustrate my invention.

Example 1

20.1 grams of 2-bromoallyl bromide and 16.6 grams of triethyl phosphite were placed in a distillation flask equipped for distillation. The reaction mixture was heated at such a temperature that ethyl bromide distilled over into the receiver where it was recovered. When no more ethyl bromide was evolved, the product remaining in the distillation flask was fractionally distilled under a reduced pressure of about 2 mm. A good yield of diethyl-2-bromoallylphosphonate having a boiling point of 79° C.–82° C./2 mm. was obtained.

By the use of 12.4 grams of trimethyl phosphite in place of triethyl phosphite in the foregoing example, a good yield of dimethyl-2-bromoallylphosphonate having a boiling point of 60° C.–62° C./2 mm. was obtained.

Example 2

11.2 grams of 2-chloroallyl chloride and 25 grams of tri-n-butyl phosphite were placed in a distillation flask equipped for distillation. The reaction mixture was heated at such a temperature that n-butyl chloride distilled over into the receiver where it was collected. When no more n-butyl chloride distilled off, the product remaining in the distillation flask was fractionally distilled under a reduced pressure of about 2 mm. A good yield of di-n-butyl-2-chloroallylphosphonate having a boiling point of 98° C.–99° C./2 mm. was obtained.

By the use of 20.1 grams of 2-bromoallyl bromide in place of 2-chloroallyl chloride in the above example, a good yield of di-n-butyl-2-bromoallylphosphonate having a boiling point of 109° C.–111° C. was obtained.

Example 3

11.2 grams of 2-chloroallyl chloride and 12.4 grams of trimethyl phosphite were placed in a distillation flask equipped for distillation. The reaction mixture was heated at 100° C. and the methyl chloride formed was collected in an appropriate receiver. When no more methyl chloride was evolved, the mixture remaining in the distillation flask was fractionally distilled under a reduced pressure of about 2 mm. A good yield of dimethyl-2-chloroallylphosphonate boiling at 48° C.–50° C./2 mm. was obtained.

Example 4

2 grams of dimethyl-2-chloroallylphosphonate, 4 grams of acrylonitrile, 0.1 gram of ammonium persulfate and 0.1 gram of sodium bisulfite were placed in 45 cc. of distilled water. Polymerization started immediately and was completed after several hours at 50° C. The reaction mixture was agitated continuously throughout the polymerization reaction. A white polymer was formed and was recovered by filtration, washed well with water and dried. This polymer is soluble in solvents such as N,N-dimethylacetamide and N,N-dimethylformamide.

Example 5

8 grams of styrene and 5 grams of dimethyl-2-bromoallylphosphonate were copolymerized at a temperature of 60° C. in an atmosphere of nitrogen using 1% by weight of the reaction mixture of acetyl peroxide as a catalyst. The polymerization reaction was run for 16 hours with agitation. The clear, hard polymer obtained can be molded.

Example 6

5 grams of di-n-butyl-2-bromoallylphosphonate, 10 grams of vinyl chloride, 2 grams of soap, 0.1 gram of ammonium persulfate and 0.2 gram of sodium bisulfite were added to 100 ccs. of water in a pressure bottle. The reaction mixture thus obtained was heated with agitation for 20 hours at 60° C. and then acetic acid was added thereto. The white polymer product formed was recovered by filtration, washed well with water and dried. The polymer thus obtained is soluble in methyl ethyl ketone and can be molded.

Example 7

5 grams of methylmethacrylate and 3 grams of dimethyl-2-chloroallylphosphonate were copolymerized at 60° C. in an atmosphere of nitrogen using 1% by weight of the reaction mixture of benzoyl peroxide as a catalyst. The polymerization reaction was conducted for 24 hours with agitation. The clear, hard polymer obtained can be molded.

Example 8

2.3 grams of metallic sodium and 30 cc. of dry toluene were placed in a 3-neck, round-bottom flask equipped with a stirrer, a dropping funnel and a reflux condenser closed at the top with a calcium chloride tube. The reaction mixture was gently refluxed and 19.4 grams of di-n-butyl hydrogen phosphite were added dropwise, with stirring. Refluxing and stirring were continued until the sodium had completely reacted. The sodium di-n-butyl phosphite thus prepared was cooled and 11.1 grams of 2-chloroallyl chloride were added dropwise, with stirring. During the addition the temperature of the reaction mixture was kept below 15° C. When the addition was complete, the reaction mixture was heated at 80° C., with stirring, for two hours, following which it was cooled and thoroughly washed with water. Fractionation of the oily layer under reduced pressure gave an excellent yield of di-n-butyl-2-chloroallylphosphonate having a boiling point of 98° C.–99° C./2 mm.

Example 9

2 grams of diethyl-2-bromoallylphosphonate, 3 grams of acrylonitrile, 1 gram of methyl acrylate, 0.1 gram of ammonium persulfate and 0.1 grams of sodium bisulfite were placed in 45 cc. of distilled water containing 2 grams of potassium lauryl sulfonate and the reaction mixture thus obtained was stirred. Polymerization started immediately and was complete after heating for eight hours at 50° C., while stirring. The emulsion formed by the reaction was broken by the addition of a saturated sodium chloride solution and the polymer which precipitated was recovered by filtration, washed well with water and dried. The polymer thus obtained is soluble in solvents such as N,N-dimethylacetamide and N,N-dimethylformamide.

Example 10

7 grams of styrene, 5 grams of di-n-butyl-2-chloroallylphosphonate and 1 gram of methylmethacrylate were copolymerized at 60° C. in an atmosphere of nitrogen using 1% acetyl peroxide as a polymerization catalyst. Upon completion of the polymerization reaction a clear, hard polymer which is readily soluble in solvents such as acetone and methyl ethyl ketone and which can be molded was obtained.

Following the procedure described in Examples 1, 2 and 3, diethyl-2-chloroallylphosphonate (B. P. 64–66° C./2 mm.), di-n-propyl-2-bromoallylphosphonate (94–96° C./2 mm.), di-n-propyl-2-chloroallylphosphonate (81–83° C./2 mm.), diisopropyl-2-bromoallylphosphonate (88–90° C./2 mm.), diisopropyl-2-chloroallylphosphonate (75–77° C./2 mm.), di-n-amyl-2-bromoallylphosphonate (96–98° C./0.2 mm.), and di-n-amyl-2-chloroallylphosphonate (85–88° C./0.2 mm.) are readily prepared.

I claim:

1. The compounds having the formula:

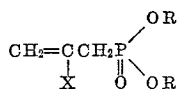

wherein R represents an alkyl group having 1 to 5, inclusive, carbon atoms and X represents a member selected from the group consisting of a chlorine atom and a bromine atom.

2. The compounds having the formula:

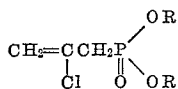

wherein R represents an alkyl group having 1 to 5, inclusive, carbon atoms.

3. The compounds having the formula:

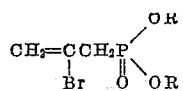

wherein R represents an alkyl group having 1 to 5, inclusive, carbon atoms.

4. Diethyl-2-bromoallylphosphonate having the formula:

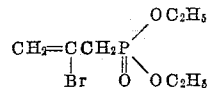

5. Dimethyl-2-bromoallylphosphonate having the formula:

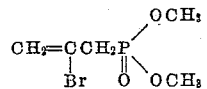

6. Dimethyl-2-chloroallylphosphonate having the formula:

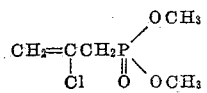

7. Di-n-butyl-2-chloroallylphosphonate having the formula:

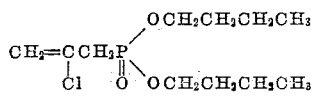

8. Di-n-butyl-2-bromoallylphosphonate having the formula:

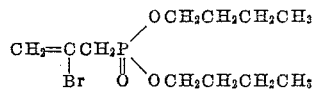

9. A process for preparing a compound having the formula:

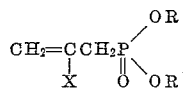

wherein R represents an alkyl group having 1 to 5, inclusive, carbon atoms and X represents a member selected from the group consisting of a chlorine atom and a bromine atom which comprises reacting an allyl halide having the formula:

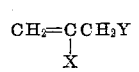

wherein X and Y each represents a member selected from the group consisting of a chlorine atom and a bromine atom with a compound having the formula:

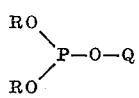

wherein R represents an alkyl group having 1 to 5, inclusive, carbon atoms and Q represents a member selected from the group consisting of an alkali metal and an alkyl group having 1 to 5, inclusive, carbon atoms.

10. A process for preparing a compound having the formula:

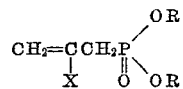

wherein R represents an alkyl group having 1 to 5, inclusive, carbon atoms and X represents a member selected from the group consisting of a chlorine atom and a bromine atom which comprises reacting an allyl halide having the formula:

$$CH_2=CCH_2Y$$
$$\quad\;|$$
$$\quad X$$

wherein X and Y each represents a member selected from the group consisting of a chlorine atom and a bromine atom with a compound having the formula:

wherein R represents an alkyl group having 1 to 5, inclusive, carbon atoms.

11. A process for preparing a compound having the formula:

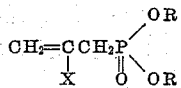

wherein R represents an alkyl group having 1 to 5, inclusive, carbon atoms and X represents a member selected from the group consisting of a chlorine atom and a bromine atom which comprises reacting an allyl halide having the formula:

$$CH_2=CCH_2Y$$
$$\quad\;|$$
$$\quad X$$

wherein X and Y each represents a member selected from the group consisting of a chlorine atom and a bromine atom with a compound having the formula:

wherein M represents an alkali metal and R represents an alkyl group having 1 to 5, inclusive, carbon atoms.

12. The process for preparing diethyl-2-bromoallyl-phosphonate which comprises reacting 2-bromoallyl bromide with triethyl phosphite.

13. The process for preparing dimethyl-2-bromoallyl-phosphonate which comprises reacting 2-bromallyl bromide with trimethyl phosphite.

14. The process for preparing dimethyl-2-chloroallyl-phosphonate which comprises reacting 2-chloroallyl chloride with trimethyl phosphite.

15. The process for preparing di-n-butyl-2-chloroallyl-phosphonate which comprises reacting 2-chloroallyl chloride with tri-n-butyl phosphite.

References Cited in the file of this patent

UNITED STATES PATENTS

| | | |
|---|---|---|
| 2,425,766 | Toy | Aug. 19, 1947 |
| 2,486,657 | Kosolapoff | Nov. 1, 1949 |
| 2,516,168 | Woodstock | July 25, 1950 |
| 2,600,783 | Kropa | June 17, 1952 |
| 2,605,258 | Rothrock | July 29, 1952 |
| 2,636,027 | Coover et al. | Apr. 21, 1953 |

U. S. DEPARTMENT OF COMMERCE

PATENT OFFICE

CERTIFICATE OF CORRECTION

Patent No. 2,827,475                                    March 18, 1958

Harry W. Coover, Jr.

It is hereby certified that error appears in the printed specification of the above numbered patent requiring correction and that the said Letters Patent should read as corrected below.

Column 1, lines 45 to 48, the formula should appear as shown below instead of as in the patent—

$$\begin{matrix} RO \\ \phantom{RO} \\ RO \end{matrix} \!\!\! > \!\! P\text{-}OM$$

Signed and sealed this 6th day of May 1958.

(SEAL)
Attest:

KARL H. AXLINE

Attesting Officer

ROBERT C. WATSON
Commissioner of Patents